June 21, 1966  S. J. NAYMAN  3,257,075
DOUBLE LENGTH SLIDE RULES
Filed June 15, 1964  3 Sheets-Sheet 1

INVENTOR.
Sam J. Nayman
BY Polachek & Saulsbury
ATTORNEYS.

June 21, 1966  S. J. NAYMAN  3,257,075
DOUBLE LENGTH SLIDE RULES
Filed June 15, 1964  3 Sheets-Sheet 2
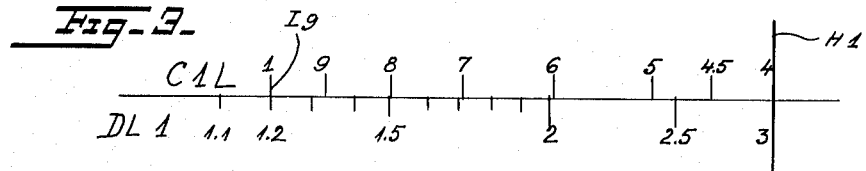
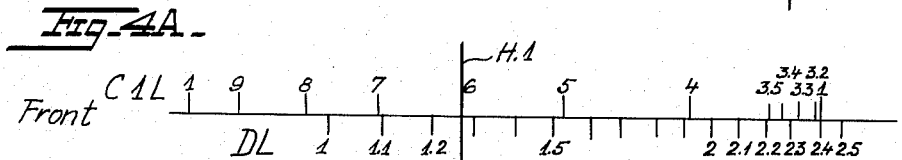
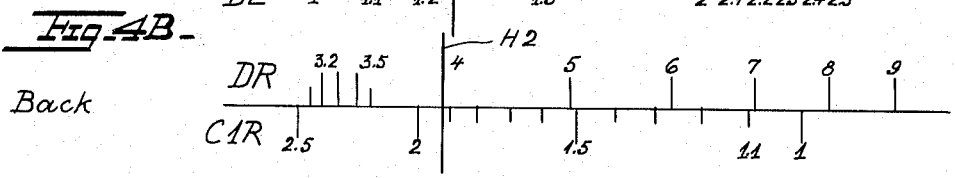
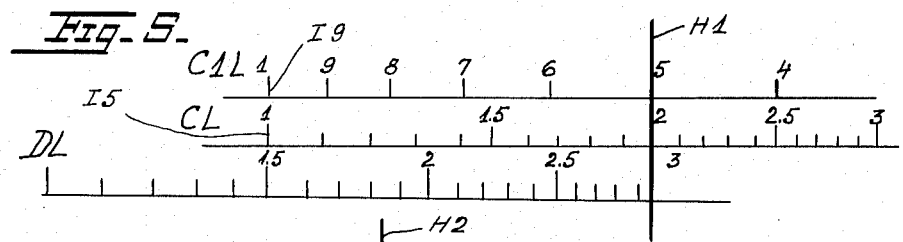
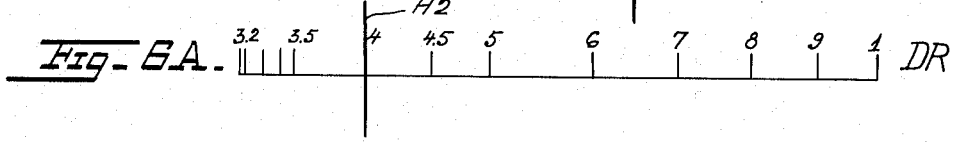
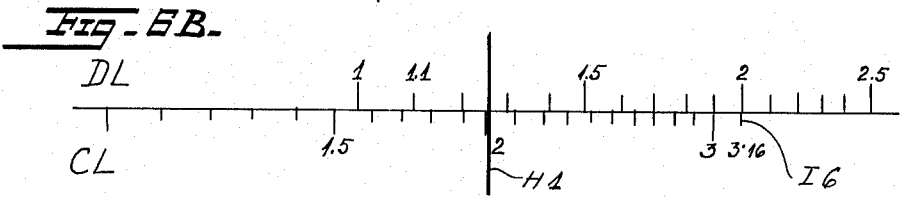
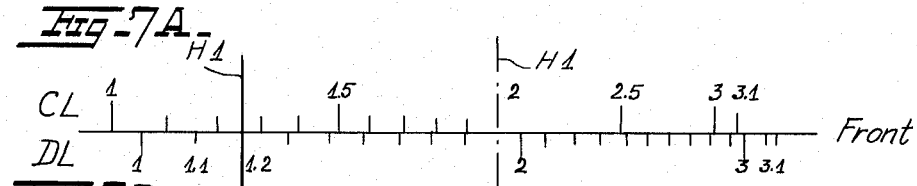
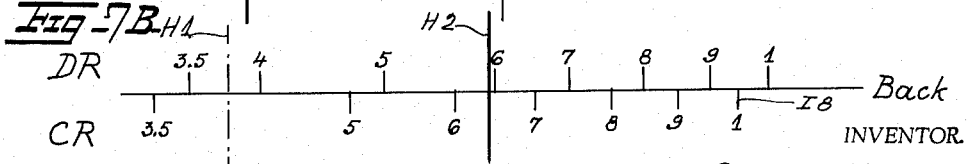
INVENTOR.
Sam J. Nayman
BY Polachek & Saulsbury
ATTORNEYS June 21, 1966    S. J. NAYMAN    3,257,075
DOUBLE LENGTH SLIDE RULES
Filed June 15, 1964    3 Sheets-Sheet 3
Fig-8-
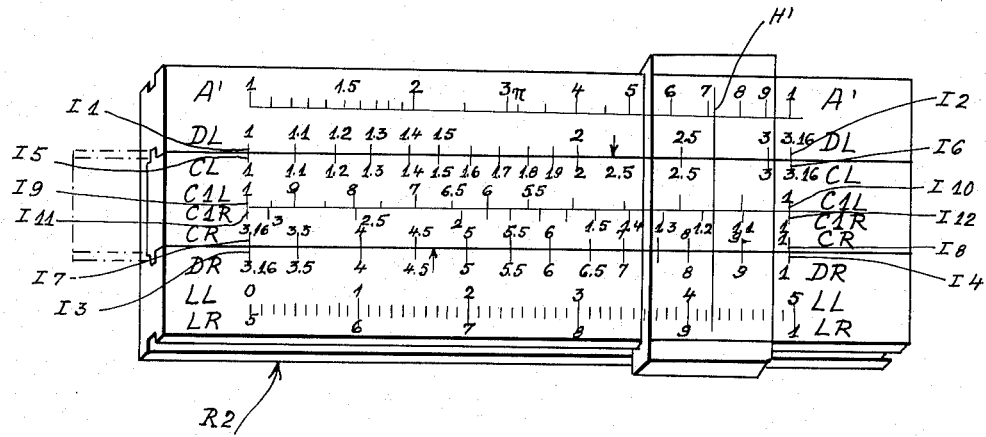
Fig-9-
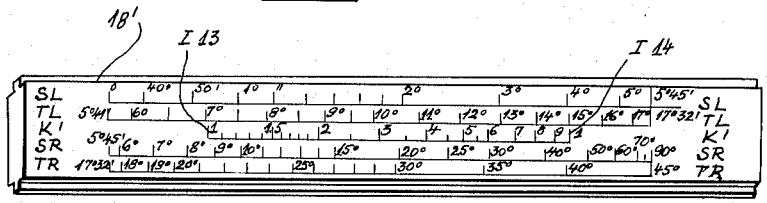
INVENTOR.
Sam S. Nayman
BY Polachek & Saulsbury
ATTORNEYS.

United States Patent Office 3,257,075
Patented June 21, 1966

3,257,075
DOUBLE LENGTH SLIDE RULES
Sam J. Nayman, Bronx, N.Y.
(98—38 57th Ave., Corona, N.Y. 11368)
Filed June 15, 1964, Ser. No. 375,212
3 Claims. (Cl. 235—70)

This invention concerns improvements in slide rules.

The invention is applicable to slide rules of the simplest Mannheim type as well as to slide rules of greater complexity with a large number of scales such as described in United States Patents 2,170,144 to L. M. Kells; 2,283,473 to J. Tyler et al.; 2,422,649 and 2,534,695 to J. R. bland; and many others. One of the characteristics encountered in all prior slide rules is that the length of any scale and the spacing between successive graduations is strictly limited to the geometrical length of the slide rule. For example, in a five-inch slide rule, each scale will be five inches long; in a ten-inch slide rule, each scale will be ten inches long, etc. According to the present invention, all the scales which have been developed for slide rule calculations are increased to twice the length of the slide rule. Thus a five-inch slide rule will have scales with graduations spaced apart the same distances as in conventional ten-inch slide rules. Ten-inch slide rules will have scales with graduations spaced apart the same distances as in conventional twenty-inch slide rules, etc. It will be at once apparent that the present invention increases the accuracy with which a slide rule of any particular size can be used to the accuracy obtained with a conventional slide rule of double its length. The manifest advantages of such an improvement in slide rule construction are obvious, in obtaining increased accuracy of calculations, reduction of cost, reduction in size, convenience to the user, less eyestrain, etc.

According to the invention, all scales on the slide rule are doubled in length to twice the length of the slide rule without increasing the length of the slide rule. This is accomplished by dividing each scale into two exactly equal parts. In one form of the invention, one scale part is located on the front of the slide rule and the other part is located on the back, aligned at opposite ends with the part on the front. In another form of the invention, both half parts of the divided scales are located on the same side of the slide rule. This doubles the capacity of the scales, allowing for more subdivisions, and providing closer, more accurate readings with one or two more decimal places than can be obtained with conventional slide rules having scales of lesser length.

It is therefore a principal object of the invention to provide a slide rule having scales thereon whose length is double the scale length of the slide rule.

Another object is to provide a slide rule of any length operable in conventional ways but having scale graduations which are twice as wide as those in conventional slide rules of the same length.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIGS. 3, 4A, 4B, 5, 6A, 6B, 7A, 7B are diagrams illustrating ways of using the slide rule of FIGS. 1 and 2.

FIG. 8 is an oblique front view of another simplified slide rule according to the invention.

FIG. 9 is an oblique rear view of the slider employed in the slide rule of FIG. 8.

Figure 1:
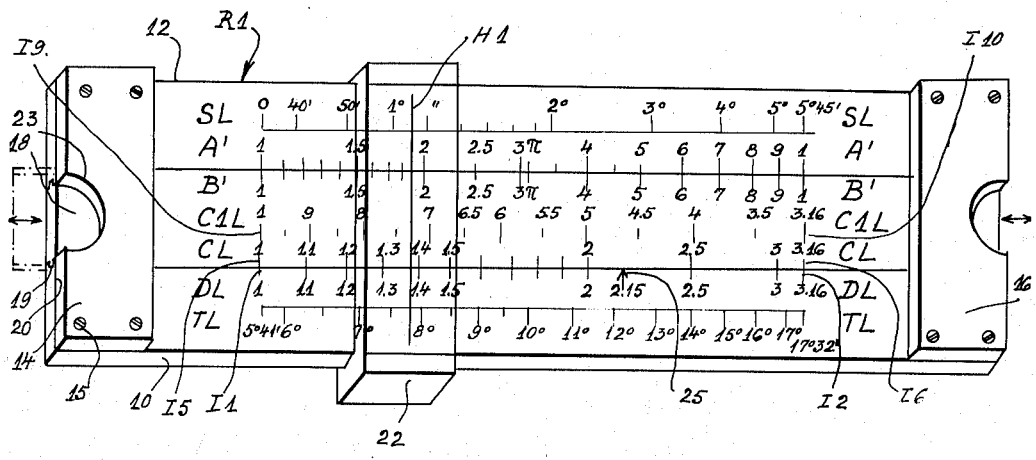
FIG. 1 is an oblique front view of a simplified slide rule embodying the invention.
Figure 2:
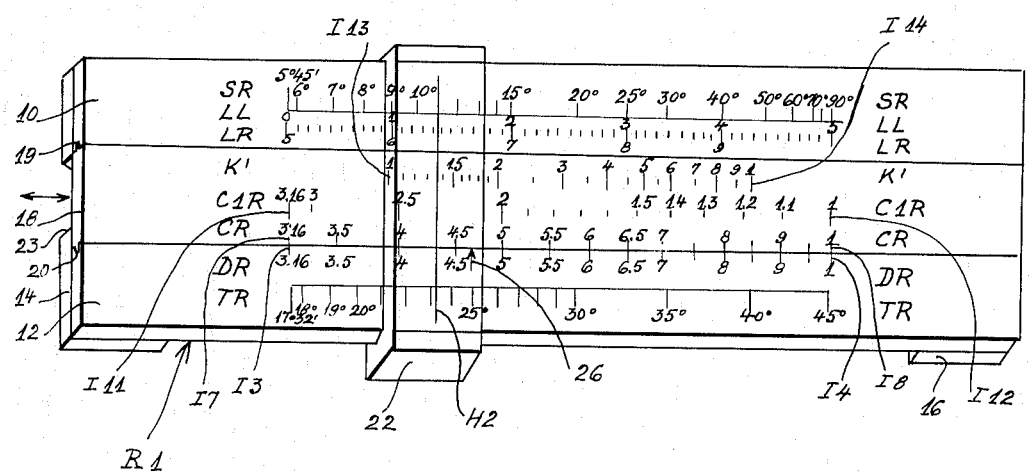
FIG. 2 is an oblique rear view of the slide rule of FIG. 1.

Slide rule R1 shown in FIG. 1 and FIG. 2 has a pair of bars or rails 10, 12 secured in coplanar spaced parallel disposition by screws 15 and by a pair of cross plates 14, 16 at opposite ends. A slider 18 has ridges 19 at opposite edges which are slidably engaged in grooves 20 of opposing edges of the rails 10, 12. A transparent cursor 22 is slidable along the rails and has hairlines H1, H2 at opposite sides disposed in registration with each other. Notches 23 in plates 14, 16 exposed ends of slider 18. To the extent described the slide rule is conventional.

D scale

The slide rule has a graduated D scale which in conventional slide rules extends from 1 to 10 on one side of the slide rule. In the present slide rule R1, the D scale is divided into equal half parts. One part is designated DL and the other part is designated DR. Half scale DL is one the front of the slide rule and extends for the full scale length of rail 10. It has a left end index I1 at 1 and a center scale index I2 at 3.16 at the right end of the half scale. Half scale DR is on the rear of the slide rule and extends for the full scale length of rail 12. Opposite ends of the two half scales are disposed in alignment with each other on the opposite sides of the slide rule. Half scale DR has another center of scale index I3 at 3.16 at the left end of the half scale and a right index designated I4 at 10 (or 1) at the right end of the half scale. Both half scales are of equal length. Indices I1 and I3 are aligned with each other transversely of the slide rule at the left end thereof. Indices I2 and I4 are aligned with each other transversely of the slide rule at the right end thereof. To turn from half scale DL to DR and vice versa the scale is turned toward or away from the user but not end for end. Thus when hairline H1 is at the left index I1 indicating 1 or unity on half scale DL, hairline H2 will be at the center index I3 indicating 3.16 on the half scale DR. Arrows 25 and 26 are provided at 2.15 and 4.65 on half scales DL and DR respectively for use with the K' scale to be described.

C scale

The C scale of conventional slide rules has been divided into two half scales designated CL and CR in a manner identical to the half scales of the D scale. Half scales CL and CR are on opposite sides of slider 18 adjacent to half scales DL and DR respectively. Half scale CL has a left index I5 and a center index I6 registering with indices I1 and I2 respectively. Half scale CR has a center index I7 and I8 registering with indices I3 and I4 respectively.

C1 scale

The C1 scale has been divided into two halves designated C1L and C1R. The half scales are on opposite sides of slider 18 with end indices aligned with end indices of the CL, CR and DL, DR half scales respectively. Thus left index I9 is aligned with index I5. Center index I10 is aligned with center index I6. Center index I11 is aligned with center index I7 and right index I12 is aligned with right index I8.

Before describing other scales of the slide rule, it will be well to illustrate the way in which the several half scales already described are used. All functions and operations for calculating are the same as with the conventional slide rule except for the following basic principles employed in the using of slide rule R1:

1. When two factors, which are set by sliding the scales, are located on the same side of the rule, the answer is found on the side indicated by the left end index or the right end index of the sliding scale.

2. When two factors are on opposite sides of the rule, the answer is found on the side indicated by the center index of the sliding scale on that side where the center index is on scale.

Multiplication

Referring now to FIG. 3, there is illustrated an example of multiplication. It is desired to perform the operation: 3×4=12. Both factors are on the same side of the scale and operation rule #1 applies. Locate 3 on the DL half scale. Set hairline H1 in line with 3 on half scale DL. Line up 4 on half scale C1L with the hairline H1. The product 12 is indicated by left index I9 of the C1L half scale on half scale DL.

FIGS. 4A and 4B illustrate multiplication where factors are on opposite sides of the slide rule. It is desired to perform the operation: 4×6=24. Locate 4 on half scale DR. Set hairline H2 at the back of the rule in line with 4 on half scale DR; see FIG. 4B. Line up 6 on half scale C1L on the front side of the rule with hairline H1 by moving the slider 18. The product 24 is indicated on half scale DL by center index I10 on half scale C1L.

FIG. 5 illustrates multiplication of three factors: 6×2.5×2=30. Locate 6 on half scale DR. Set hairline H2 in line with 6. Move slider 18 and line up 2.5 on half scale C1R with hairline H2. Slide cursor to line up hairline H1 with 2 on half scale CL. Product is 30 on half scale DL lined up with hairline H1. It will be noted that the product of the first two factors 6 and 2.5 is 15.0 on half scale DL in line with index I9. The third factor which is 2 on half scale CL and 15.0 on half scale DL are on the front as shown in FIG. 5. Therefore the answer is also on the front in line with 2 in accordance with Rule #1.

Division

FIGS. 6A, 6B illustrate performance of the operation 4÷2=2. Locate 4 on half scale DR as shown in FIG. 6A. Set hairline H2 in line with 4. Turn over the slide rule and line up 2 on half scale CL with hairline H1. The answer 2 is indicated by the center index I6 on half scale CL on half scale DL, as shown in FIG. 6B.

FIGS. 7A and 7B illustrate performance of the operation 12÷4×2=6. Locate 12 on half scale DL. Move the cursor to align hairline H1 with 12 on DL see FIG. 7A. Line up 4 on half scale CR with hairline H2 by moving the slider 18. Slide cursor to set the hairline H1 at 2 on half scale CL shown dotted in FIG. 7A. The answer 6 is on the half scale DR indicated by the hairline H2. It will be noted that the result of the division 12÷4 is 3 which is on the same side as multiplying factor 2, so that the final answer 6 is on the same side as the right index I8 of half scale CR, in accordance with Rule #1.

A and B scales

In conventional slide rules the A and B scales are actually two half-size logarithmic scales. In the present invention the A scale is expanded in length so that only a single half scale A′ and a single half scale B′ may be sufficient to perform all the functions of prior A and B scales. The reading of a square on half scale A′ will consist of an odd number of digits if the square root is located on half scale DL. The square will have an even number of digits if the square root is located on the half scale DR. Squares and square roots are thus obtained by moving the cursor 22 and reading off squares and square roots at the hairlines. The expanded half scales A′ and B′ appear on the front of rail 12 and slider 18 as shown in FIG. 1.

L scale

The logarithmic L scale in conventional slide rules is graduated into divisions of equal length. In the present invention only one half of the L scale may be sufficient with two sets of scale numbers. Half scale LL has numbers reading from 0 to .5 and half scale LR has numbers reading from .5 to 1.0 on the back side of rail 10. By using the cursor a reading below .5 on the half scale LL indicated by hairline H2 will correspond with the mantissa of the logarithm on half scale DL indicated by hairline H1. A number above .5 on half scale LR will coincide with the mantissa of the logarithm on half scale DR.

S scale

The sine of an angle is found on half scale A′ after the angle is located on either the trigonometric half scale SL or half scale SR. The conventional trigonometric S scale according to the present invention is divided in half and expanded to form two half scales each having a length equal to the scale length of the slide rule. The half scales SL and SR appear on opposite sides of the slide rule R1 on rails 10 and 12, respectively. The scales are divided at 5°45′ which is the halfway point of a full S scale. When half scale SL is used a zero will be placed after the decimal point preceding the significant figures found half scale A′. When the half scale SR is used, the decimal point will immediately precede the significant figures of the answer. As examples:

sine 1°20′ (on SL)=.0232 on A′;
sine 13°24′ (on SR)=.232 on A′.

T scale

The conventional trigonometric T scale according to the present invention is divided in half and expanded to form two half scales each having a length equal to the scale length of the slide rule. The half scales TL and TR appear on opposite sides of the slide rule on rails 10 and 12, respectively. The scales are divided at 17°32′ which is the halfway point of a full undivided T scale. For problems of tangents of angles the T scale is used in coordination with D scale, as for example DL with TL and DR with TR.

K scale

The K scale in conventional slide rules is actually a logarithmic scale having three equal sections with very narrow graduations, one-third narrower than those of the D scale. In the present invention, the K′ scale may have only a single section which is expanded double in length as compared with a K scale section, so that it is two-thirds of the scale length of the slide rule but one-third the total length of half scale DL plus half scale DR. It is centered on the back of slider 18. Its use is coordinated with index arrows or points 25 and 26 on half scales DL and DR. Index arrow 25 is located two-thirds the distance from index I1 at the left end of half scale DL. Index arrow 26 is located two-thirds the distance from index I4 at the right end of scale DR. The proper values of cubes on this scale are found when the scale is set in coincidence with the arrows. The cube roots are read within the proper range of coincidence on the half scales DL and DR. Conversely cubes are read on the K′ scale from the cube roots on the half scales when the K′ scale is properly set with respect to the arrows 25, 26. As examples.

(1) For numbers having 1 or 1 plus a multiple of 3 digits, reverse slider 18 and set left index I13 of scale K′ in line with left index I1 of half scale DL.

15×15×15: set hairline H1 at 15 on DL and find cube 3375 on K′.

$8^3$: set hairline H1 at 8 on K′ and find cube root 2 on DL.

(2.) For numbers having 2 or 2 plus a multiple of 3 digits, (a) set left index I13 of K′ in line with arrow 25 on DL.

2.5×2.5×2.5: set hairline H1 at 2.5 on DL and find cube 15.625 on K′.

$27^3$: set hairline H1 at 27 on K′ and find cube root 3 on half scale DL.

(b) set right index I14 in line with arrow 26 on half scale DR.

$3.5 \times 3.5 \times 3.5$: set hairline H2 at 3.5 on half scale DR and find cube 42.875 on K'.

$64^3$: set H2 at 64 on K' and find cube root 4 on half scale DR. Either 2A or 2B is used selectively when one or the other causes a factor to be "off the rule."

(3) For numbers having 3 digits or multiples of 3 digits, set right index I14 of scale K' in line with the right index I4 on half scale DR.

$5 \times 5 \times 5$: set hairline H2 at 5 on half scale DR and find the cube 125 on K'.

$512^3$: set hairline H2 at 512 on K' and find cube root 8 on half scale DR.

In FIGS. 8 and 9 is shown slide rule R2 which is similar to rule R1 in that the half scales have the same designations as they do in rule R1. On one side of slider 18' are scales SL, TL, K', SR and TR. On upper rail 12' is half scale A' and half scale DL. On lower rail 10' are half scales DR, LL and LR. The slide rule is used in a manner similar to that explained in connection with slide rule R1 except that turning over of the slide rule is not required. Each of the scales having the same index indications as in FIGS. 1 and 2. Slider 18' is reversed for using the SL, TL, K, SR and TR scales. The slide rule R2 is a simpler and less expensive construction than that of slide rule R1.

The slide rules R1 and R2 have been explained in connection with a very limited number of the most common scales. A slide rule which is to be provided with CF, CIF, DF, LL1, LL2, LL3, ST, LL01, LL02 and LL03 scales or other scales, shown for example in the slide rules of Patents 2,283,473 and 2,534,695, would be constructed in accordance with the principles of the present invention. All scales would be expanded in length so that a half scale would equal in length the scale length of the slide rule. Thus, for a given length of slide rule embodying the present invention, the scale graduations would be twice the width that they are in a conventional slide rule of the same length. The basic principles set forth below would thus be followed in constructing a log-log slide rule embodying the present invention to result in greater accuracy of readings, less eyestrain and greater user satisfaction.

It shall be understood that letters "L" and "R" following the actual designation of the scale are included in the drawing and description, merely to identify left and right halves of the scales for descriptive purpose only and not as a permanent designation of the scales.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. In a slide rule, a first logarithmic scale divided into two half scale parts of equal length, one half scale part having opposite end indices aligned transversely of the rule with opposite end indices of the other half scale part, and a second logarithmic scale having a total length equal to two-thirds the length of each of the half scale parts, said one half scale part having a first designated index point thereon spaced from the left end of said one half scale part a distance equal to the length of the second scale and the other scale part having a second point designated index thereon spaced from the right end of the said other half scale part a distance equal to the length of the second scale, whereby the second scale provides readings of cubes of numbers on the respective half scale parts when one end of the second scale is aligned selectively with either of said designated index points.

2. A slide rule as recited in claim 1, wherein both of the half scale parts are disposed on the same side of the rule.

3. A slide rule as recited in claim 1, wherein the two half scale parts are disposed on opposite sides respectively of the rule.

References Cited by the Examiner
UNITED STATES PATENTS

| | | | |
|---|---|---|---|
| 1,168,059 | 1/1916 | Cuntz | 235—70 |
| 1,250,379 | 12/1917 | Stillman et al. | 235—70 |
| 1,525,752 | 2/1925 | Larkey | 235—70 |
| 2,138,879 | 12/1938 | Poole | 235—70 |
| 2,285,722 | 6/1942 | Kells et al. | 235—70 |
| 2,422,649 | 6/1947 | Bland | 235—70 |
| 2,894,337 | 7/1959 | Rowlings | 235—70 X |

OTHER REFERENCES

Keuffel and Esser Co., Catalog No. 8, Slides Rules, Hoboken, New Jersey, 1962. Pages 8–7 and 8–13 relied on.

LEO SMILOW, *Primary Examiner.*

C. G. COVELL, *Assistant Examiner.*